Patented Feb. 27, 1923.

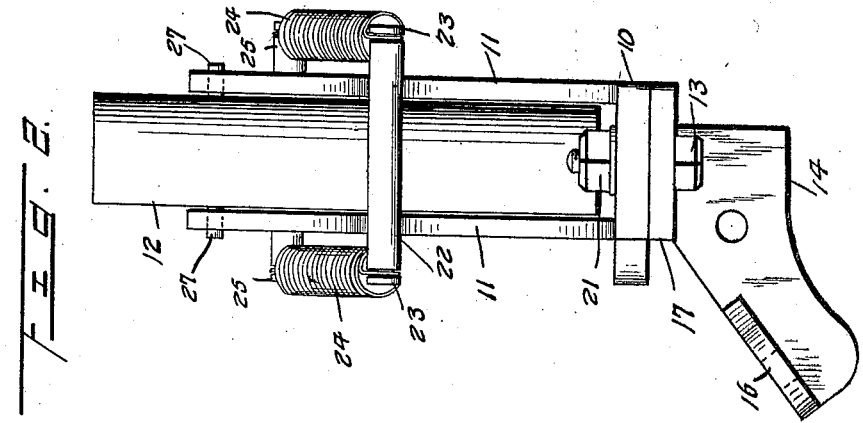
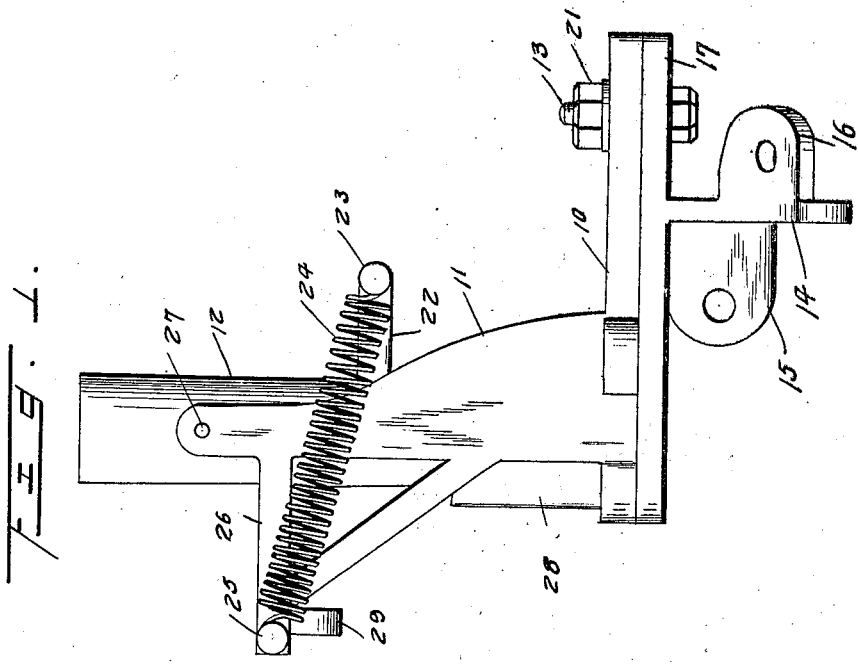

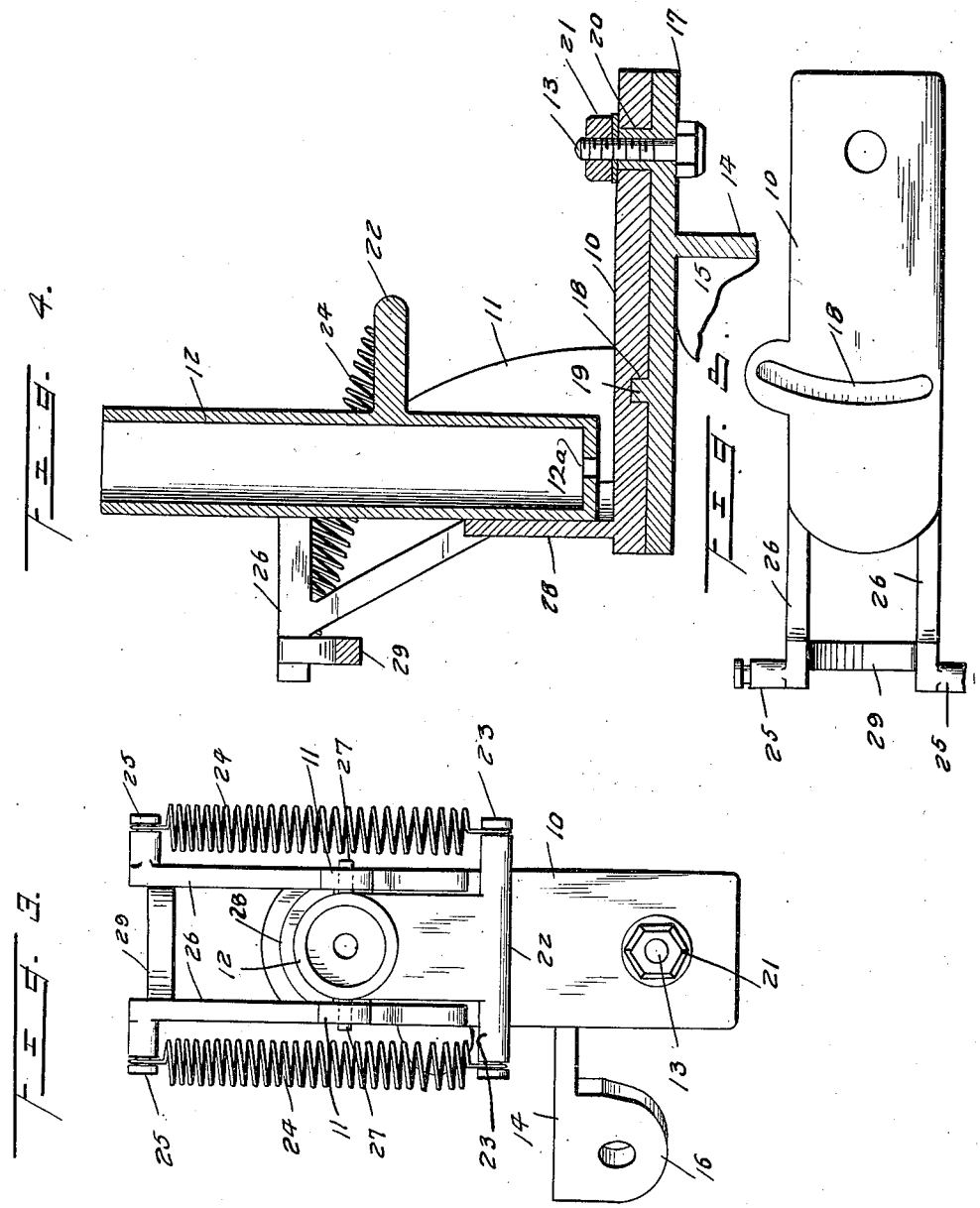

1,447,058

UNITED STATES PATENT OFFICE.

FRANK XAVIER BÉLIVEAU, OF BOUTIN, SASKATCHEWAN, CANADA.

WHIP HOLDER.

Application filed April 17, 1922. Serial No. 553,444.

*To all whom it may concern:*

Be it known that I, FRANK X. BÉLIVEAU, a subject of the King of Great Britain, residing at Boutin, in the Province of Saskatchewan and Dominion of Canada, have invented certain new and useful Improvements in a Whip Holder; and I do hereby declare the following to be a full, clear, and exact description of the invention, such as will enable others skilled in the art to which it appertains to make and use the same.

The object of the invention is to provide a tumbling whip holder of a construction adapting the whip to be used in the driving and control of draft animals without removing the whip from the holder and therefore without involving inconvenience of having to place the whip in the socket after its use and under frequently inconvenient conditions as when the hands are required for other purposes; and more particularly it is the object to provide a device of this type for use in connection with binders, harvesters and other agricultural machinery which require the operator to manipulate a number of levers and other devices and usually afford the operator but little opportunity for the use of a whip if it must be removed from a whip socket for that purpose; and with these objects in view the invention consists in a construction, combination and arrangement of parts of which a preferred embodiment is shown in the drawing, wherein:

Figure 1 is a side view of a whip holder embodying the invention,

Figure 2 is a front view of the same,

Figure 3 is a plan view thereof,

Figure 4 is a longitudinal vertical sectional view;

Figure 5 is an inverted plan view of the base.

The device consists essentially of a base 10 having uprights 11 between which is pivotally mounted a tiltable whip socket 12, said base being pivotally mounted as by means of a bolt 13 upon a bracket 14 attachable by any suitable means to the vehicle or machine in connection with which the whip holder is to be used, as for example by means of the ears 15 and 16, said bracket having a horizontal supporting plate 17 upon which the base is free to swing laterally, limited by the extent of a transverse arcuate slot or groove 18 engaging an upstanding stud 19 on the supporting plate. The supporting plate is preferably provided with a sleeve 20 upon which the base is directly mounted and through this sleeve and the base extends the bolt 13 fitted with a suitable retaining nut 21.

The socket 12 is provided with a rearwardly extending grip 22 having a transversely projecting pin 23 of which the extremities are connected by springs 24 with studs 25 projecting laterally from the brackets 26 which extend forwardly from the standards, said grip 22 being arranged below the plane of the pivotal point or axis 27 of the socket so that the springs yieldingly hold the socket in an upright or normal position limited by a stop 28 which spans the interval between the standards near their lower ends. An arcuate stop 29 is also supported between the brackets 26 to limit the forward swinging movement of the socket.

This stop 29 is not located in the path of movement of the upper end of the socket but is in the path of movement of a whip stock seated in the socket and serves to prevent the socket from being tilted far enough forward to bring the line of strain of the return springs 24 above the plane of the pivot or axis 27. Therefore when the socket is released by the operator the springs return the same to the normal or upright positions. Also in the absence of a whip in said socket, the latter upon being tilted will clear stop 29 to assume such an angle as to permit emptying of mud, gravel or other material. An opening 12$^a$ in the base of the socket facilitates drainage of water and to some extent mud and fine gravel.

With the apparatus described it is possible for the operator to reach toward the whip, without looking at it and throw the socket forward to bring the whip into operation and swing it either to the right or left to suit the animal to which he desires to apply the lash, and may then immediately release the same with the assurance that it will be returned to the normal position and that the whip will not be displaced in that operation. Also the grip 22 may be engaged from below by one foot of the operator and raised to operate the socket 12. The use of the device obviates entirely the necessity of removing the whip from the socket as it may be used with practically the same freedom by permitting it to remain seated in the socket, due to the fact that the socket is adapted for swinging movement in both horizontal and vertical planes, or in other words for universal movement under the direct control of the operator.

Having thus described the invention, what I claim is:—

1. A whip holder having a base provided with upstanding standards between which a whip seating socket is pivotally mounted for swinging movement in a vertical plane, said base being mounted for swinging movement in a horizontal plane, and a yielding means for maintaining the socket in a substantially upright positon, in combination with a supporting bracket provided with means for attachment to a vehicle and having a supporting plate upon which the base is mounted for horizontal swinging movement, the said lateral movement being limited by a slot in the base engaging a stud on said supporting plate.

2. In a whip holder, a movable socket to receive the whip, a stop disposed out of the path of movement of the socket to facilitate emptying of the latter, and said stop being in the path or movement of and engageable by a whip carried by the socket.

3. In a whip holder, a movable socket to receive the whip, a grip engageable to move the socket, said grip being located relatively close to and above the base of the socket to facilitate foot-operation thereof.

4. In a whip holder, a movable socket to receive the whip, a standard in which said socket is pivoted, a stop on said standard disposed out of the path of movement of the socket to facilitate emptying of the latter, and said stop being in the path of movement of and engageable by a whip carried by the socket.

5. In a whip holder, a movable socket to receive the whip, a base, a standard rising from said base, means pivoting said socket to said standard, a bracket on said standard, a stop on said bracket disposed out of the path of movement of the socket to facilitate emptying of the latter, said stop being in the path of movement of and engageable by a whip carried by the socket, a spring connected to the socket and to said bracket to urge the former to normal position, and a stop on the base engageable by the socket in normal position.

6. In a whip holder, an attaching bracket, a base pivoted on said bracket, an arcuate slot and pin connection between the bracket and base to permit lateral movement of the base, and a whip holder mounted on said base to swing from a substantially horizontal axis.

In testimony whereof I affix my signature in presence of two witnesses.

FRANK XAVIER BÉLIVEAU.

Witnesses:
 H. A. SPENCE,
 B. MALONEY.